(12) United States Patent
Gonoi et al.

(10) Patent No.: US 10,723,021 B2
(45) Date of Patent: Jul. 28, 2020

(54) MANUFACTURING DEVICE

(71) Applicant: DAI-ICHI DENTSU LTD., Chofu, Tokyo (JP)

(72) Inventors: Ikuo Gonoi, Chofu (JP); Kazuhiro Hosokawa, Chofu (JP); Kenichi Nakamura, Kasugai (JP)

(73) Assignee: DAI-ICHI DENTSU LTD., Chofu, Tokyo (JP)

( * ) Notice: Subject to any disclaimer, the term of this patent is extended or adjusted under 35 U.S.C. 154(b) by 490 days.

(21) Appl. No.: 15/542,316

(22) PCT Filed: Sep. 1, 2015

(86) PCT No.: PCT/JP2015/074822
§ 371 (c)(1),
(2) Date: Jul. 7, 2017

(87) PCT Pub. No.: WO2016/111041
PCT Pub. Date: Jul. 14, 2016

(65) Prior Publication Data
US 2018/0272532 A1     Sep. 27, 2018

(30) Foreign Application Priority Data
Jan. 9, 2015   (JP) ................................ 2015-003296

(51) Int. Cl.
*B23P 19/10*     (2006.01)
*B25J 9/16*      (2006.01)
(Continued)

(52) U.S. Cl.
CPC ............ *B25J 9/1664* (2013.01); *B23P 19/06* (2013.01); *B23P 19/10* (2013.01); *B25J 9/1065* (2013.01);
(Continued)

(58) Field of Classification Search
CPC ........... B23P 19/00; B23P 19/04; B23P 19/10; B23P 21/00; B23P 19/06; B25J 13/08;
(Continued)

(56) References Cited

U.S. PATENT DOCUMENTS 4,221,516 A * 9/1980 Haaker ...................... B25J 3/00
414/5
4,265,147 A * 5/1981 Fox ....................... B25H 1/0021
248/571

(Continued)

FOREIGN PATENT DOCUMENTS

JP      S58211890 A     12/1983
JP      H0732230 A      2/1995
(Continued)

OTHER PUBLICATIONS

Office Action from the Japanese Patent Office dated Apr. 9, 2019 in related Japanese application No. 2016-568272, and machine translation thereof.
(Continued)

*Primary Examiner* — Scott A Smith
(74) *Attorney, Agent, or Firm* — J-Tek Law PLLC; Jeffrey D. Tekanic; Mark A. Ussai

(57) ABSTRACT

A manufacturing device includes a first hinge defining a first axis of rotation and having an arm connected thereto. A parallel link mechanism includes a second hinge connected to the arm and first and second links pivotably connecting the second hinge to an attachment such that the attachment is vertically movable relative to the second hinge. A nut runner is configured to rotatably drive a fastening tool about a third axis of rotation and is connected to the attachment. A first motor is provided on the first hinge and is configured to horizontally rotate the arm about the first axis of rotation. A second motor is provided on the second hinge and is configured to horizontally rotate the parallel link mechanism (Continued)

about a second axis of rotation that is parallel to the first and third axes of rotation.

20 Claims, 12 Drawing Sheets

(51) Int. Cl.
| | |
|---|---|
| *B23P 19/06* | (2006.01) |
| *B25J 13/08* | (2006.01) |
| *B25J 11/00* | (2006.01) |
| *B66C 23/00* | (2006.01) |
| *B25J 9/10* | (2006.01) |
| *B25J 13/02* | (2006.01) |
| *B25J 19/06* | (2006.01) |
| *B25J 15/00* | (2006.01) |

(52) U.S. Cl.
CPC ............... *B25J 11/00* (2013.01); *B25J 13/02* (2013.01); *B25J 13/085* (2013.01); *B25J 19/06* (2013.01); *B66C 23/00* (2013.01); *B23P 19/066* (2013.01); *B25J 15/0019* (2013.01); *Y10T 29/53061* (2015.01); *Y10T 29/53417* (2015.01)

(58) Field of Classification Search
CPC ........ B25J 13/02; B25J 13/085; B25J 9/0018; B25J 9/1664; B25J 9/1065; B25J 15/0616; B25J 19/06; B25J 15/0019; Y10T 29/53061; Y10T 29/53383; Y10T 29/53417
USPC ............... 173/2, 176, 110, 216, 42, 44, 190; 700/230, 258, 264, 262; 29/281.1, 559, 29/712, 783, 795
See application file for complete search history.

(56) References Cited

U.S. PATENT DOCUMENTS

| | | | | |
|---|---|---|---|---|
| 5,150,506 A | * | 9/1992 | Kotake | ................. B62D 65/02 29/407.05 |
| 5,513,428 A | * | 5/1996 | Shiramizu | ............. B23P 21/004 29/712 |
| 5,918,358 A | * | 7/1999 | Ffield | ..................... B21J 15/022 29/281.1 |
| 8,326,454 B2 | * | 12/2012 | Odashima | ............... B23P 19/10 700/230 |
| 2004/0052629 A1 | * | 3/2004 | Shibata | ................... B23P 19/06 414/719 |
| 2005/0262692 A1 | * | 12/2005 | Mondrusov | ............. B23P 19/04 29/890.123 |
| 2007/0096674 A1 | | 5/2007 | Hashimoto et al. | |
| 2007/0112458 A1 | | 5/2007 | Kondo et al. | |
| 2007/0253799 A1 | * | 11/2007 | O'Connell | ............ B23P 19/069 414/222.01 |
| 2008/0092373 A1 | * | 4/2008 | Lim | ........................ B23P 19/06 29/700 |
| 2009/0289591 A1 | * | 11/2009 | Kassow | ............... B25J 19/0004 318/568.13 |
| 2010/0185321 A1 | | 7/2010 | Odashima | |
| 2010/0242690 A1 | * | 9/2010 | Tohyama | ................ B23P 19/06 81/451 |
| 2011/0010012 A1 | | 1/2011 | Murayama et al. | |
| 2011/0160905 A1 | * | 6/2011 | Asamizu | ............. B25J 15/0019 700/258 |

FOREIGN PATENT DOCUMENTS

| | | |
|---|---|---|
| JP | H11170201 A | 6/1999 |
| JP | 2002346857 A | 12/2002 |
| JP | 2004291173 A | 10/2004 |
| JP | 2005118959 A | 5/2005 |
| JP | 2005193339 A | 7/2005 |
| JP | 2007118141 A | 5/2007 |
| JP | 4048142 B2 | 2/2008 |
| JP | 2009034754 A | 2/2009 |
| JP | 2009202281 A | 9/2009 |

OTHER PUBLICATIONS

English translation of the International Search Report dated Oct. 27, 2015 for parent application No. PCT/JP2015/074822.

Toru Tsumugiwa, et al., "Ningen to Robot no Rikigakuteki Sogo Sayo ni Okeru Dotokusei Taiiki no Kahen Seigyo o Jitsugen suru Device no Kaihatsu", Dai 30 Kai Annual Conference of the Robotics Society of Japan, Yokoshu DVD-ROM, Sep. 17, 2012.

English translation of the Written Opinion of the International Searching Authority dated Oct. 27, 2015 for parent application No. PCT/JP2015/074822.

* cited by examiner

MANUFACTURING DEVICE

CROSS-REFERENCE

This application is the US national stage of International Patent Application No. PCT/JP2015/074822 filed on Sep. 1, 2015, which claims priority to Japanese Patent Application 2015-003296 filed on Jan. 9, 2015.

TECHNICAL FIELD

The present invention relates to a manufacturing device.

BACKGROUND ART

As a known manufacturing device, a fastening device is disclosed in Patent Literature 1. This fastening device includes a nut runner as a manufacturing means, a link mechanism, drive means, and current coordinate detection means. This fastening device also can be recognized as including storage means and control means.

The nut runner has an acting part that is capable of acting on a workpiece. More specifically, the nut runner has a rotating shaft that is capable of being rotatably driven, and the acting part is capable of engaging a fastener into the workpiece. The link mechanism makes possible movement of the nut runner while holding the nut runner. The drive means drives the link mechanism to move the nut runner. The current coordinate detection means detects the current coordinates of the nut runner. The storage means stores target coordinates for positioning the nut runner in order for the acting part of the nut runner to act on the workpiece. The control means controls the drive means to move the nut runner from the current coordinates to the target coordinates.

In this fastening device, if a plurality of target coordinates is stored in the storage means together with their order, the nut runner automatically moves to each of the target coordinates. In addition, in this fastening device, the acting part automatically advances straight ahead in an axial direction, such as the vertical direction, and the rotating shaft rotates simultaneously, at each of the target coordinates. Hence, with this fastening device, a plurality of fasteners can be automatically fastened to a workpiece without employing a worker for the fastening work.

CITATION LIST

Patent Literature

Patent Literature 1: Japanese Patent No. 4048142

SUMMARY OF THE INVENTION

However, in a manufacturing device such as the known fastening device, the control means controls all of the movements of the manufacturing means from the current coordinates to the target coordinates, the advancing straight ahead movement in the axial direction of the acting part, and the rotation of the rotating shaft at the target coordinates. In other words, this type of manufacturing device is a robot that does not involve a worker in the manufacturing work at all. For this reason, this type of manufacturing device becomes large as a whole, and its manufacturing cost tends to become extremely high.

A manufacturing device according to one aspect of the present teachings includes:

manufacturing means (e.g., a nut runner) that has an acting part (e.g., a socket) capable of acting on a workpiece;

a link mechanism that holds the manufacturing means and is capable of moving the manufacturing means;

drive means (e.g., a servo motor) that drives the link mechanism to move the manufacturing means;

current coordinate detection means (e.g., a position sensor) that detects current coordinates of the manufacturing means;

storage means (e.g., a digital memory) that stores target coordinates for positioning the manufacturing means in order for the acting part to act on the workpiece; and control means (e.g., a controller that contains a microprocessor) that controls the drive means to move the manufacturing means from the current coordinates to the target coordinates, and further includes continuation-stop detection means (e.g., a handle switch) that is provided on the manufacturing means, generates a continuation signal when a manual input of an operator is being continuously performed, and generates a stop signal when the manual input is not being continuously performed, wherein the control means has a drive continuation-stop section (e.g., a program stored in the storage means) that drives the drive means in accordance with the continuation signal and stops the drive means in accordance with the stop signal.

In a manufacturing device according to the above-described aspect of the present teachings, the continuation-stop detection means is provided on the manufacturing means, and the control means has the drive continuation-stop section. Hence, while the manufacturing means is being moved from the current coordinates to the target coordinates, the continuation-stop detection means generates a continuation signal while the operator continuously performs the manual input, so that the drive continuation-stop section continues to drive the drive means in accordance with the continuation signal. Because the manufacturing means can be moved to the target coordinates as long as the operator continuously performs the manual input, the operator need not memorize the target coordinates, and the burden on the operator is small.

On the other hand, if the manual input is not being continuously performed such as when the operator unexpectedly releases his/her hand during the movement of the manufacturing means from the current coordinates to the target coordinates, the continuation-stop detection means generates a stop signal, so that the drive continuation-stop section stops the drive means in accordance with the stop signal. Thus, this manufacturing device involves the operator during the movement of the manufacturing means from the current coordinates to the target coordinates. In addition, even though the operator is involved in the manufacturing work, the safety of the operator is ensured, because the drive means stops without going out of control when the manual input is no longer being continuously performed. Hence, this manufacturing device does not require a partition wall or the like for isolating the operator from the manufacturing work.

Accordingly, with regard to this manufacturing device, a reduction of size and a reduction of manufacturing cost can be realized.

A manufacturing device according to the above-described aspect of the present teachings may further include manual force detection means (e.g., a force sensor) that is provided on the manufacturing means and detects a manual force that is being applied by the operator. It is then preferable that the control means has a first drive speed changing section (e.g., a program stored in the storage means) that changes a drive speed of the drive means in accordance with a signal output of the manual force detection means.

In such an embodiment, the drive speed of the drive means changes depending on the manual force that the operator exerts on the manufacturing means. For example, if the operator manipulates (e.g., squeezes) the manufacturing means with a strong manual force, the drive speed of the drive means becomes faster; on the other hand, if the operator manipulates (e.g., squeezes) the manufacturing means with a weak manual force, the drive speed of the drive means becomes slower. Hence, with such a manufacturing device, an operator who is not accustomed to a certain fastening work can take his/her time to do the fastening work carefully, and get accustomed to the fastening work. On the other hand, if the operator has already become accustomed to doing a particular fastening work, it is possible to finish that fastening work earlier by squeezing the manufacturing means more tightly or strongly during the fastening work, thereby causing the manufacturing means to move to each of the target coordinates more quickly.

The manufacturing device according to any of the above-described aspects of the present teachings may further include operation state detection means (e.g., a current sensor) that detects a physical quantity (e.g., a current) that is representative of the amount of the actuation of the drive means. It is then preferable that the control means has a second drive speed changing section that changes a (the) drive speed of the drive means in accordance with a signal output from the operation state detection means.

In this case, the drive speed of the drive means changes depending on the physical quantity of the actuation of the drive means. For example, if the drive means utilizes a servomotor, the current value of the current that is being supplied to the servomotor can be detected by the operation state detection means. If the current value exceeds a threshold, it is conceivable that the manufacturing means is interfering with some kind of obstacle and the torque(s) of the servomotor(s) has (have) increased. Hence, in this case, the drive speed can be reduced or stopped. Also, if the drive means utilizes a hydraulic pump, the flow rate of pressurized oil that is being supplied to the hydraulic pump can be detected by the operation state detection means. Moreover, if the drive means utilizes an air cylinder, the flow rate of pressurized air that is being supplied to the air cylinder can be detected by the operation state detection means. Otherwise, it is sufficient if the operation state detection means detects various physical quantities that depend on the type of the drive means.

It is preferable that the control means has a braking section that controls the drive means such that, when the manufacturing means is located in the vicinity of the target coordinates, the manufacturing means converges to the target coordinates. In this case, movement of the manufacturing means can be performed smoothly from the current coordinates to the target coordinates.

It is preferable that the control means has a positioning section that generates a positioning signal when the manufacturing means converges to the target coordinates. In this case, it is possible to confirm that the manufacturing means is positioned at the target coordinates. Hence, for example, the operator can perform the manipulations on the manufacturing means based on this confirmation, and the manufacturing operation can be written into the storage means.

It is preferable that the manufacturing means has a rotating shaft that is capable of being rotatably driven, the acting part is capable of engaging a fastener, and the acting part is a nut runner that is capable of fastening the fastener to the workpiece by rotating the rotating shaft while advancing the acting part straight ahead in the axial direction. In this case, manufacturing work that fastens the fastener to the workpiece can be performed by using the nut runner.

It is preferable that the manufacturing means has a rotating shaft that is capable of being rotatably driven by a servomotor, and the acting part is a servo press that is capable of pressing the workpiece by rotating the rotating shaft while advancing straight ahead in the axial direction. In this case, manufacturing work such as crimping and press-fitting of the workpiece can be performed by the servo press.

According to the manufacturing device of the present invention, a reduction of size can be realized and a reduction of manufacturing cost can be realized.

DETAILED DESCRIPTION

Hereinafter, Embodiments 1 to 3 that embody the present invention will be described with reference to the drawings.

Embodiment 1

Figure 1:
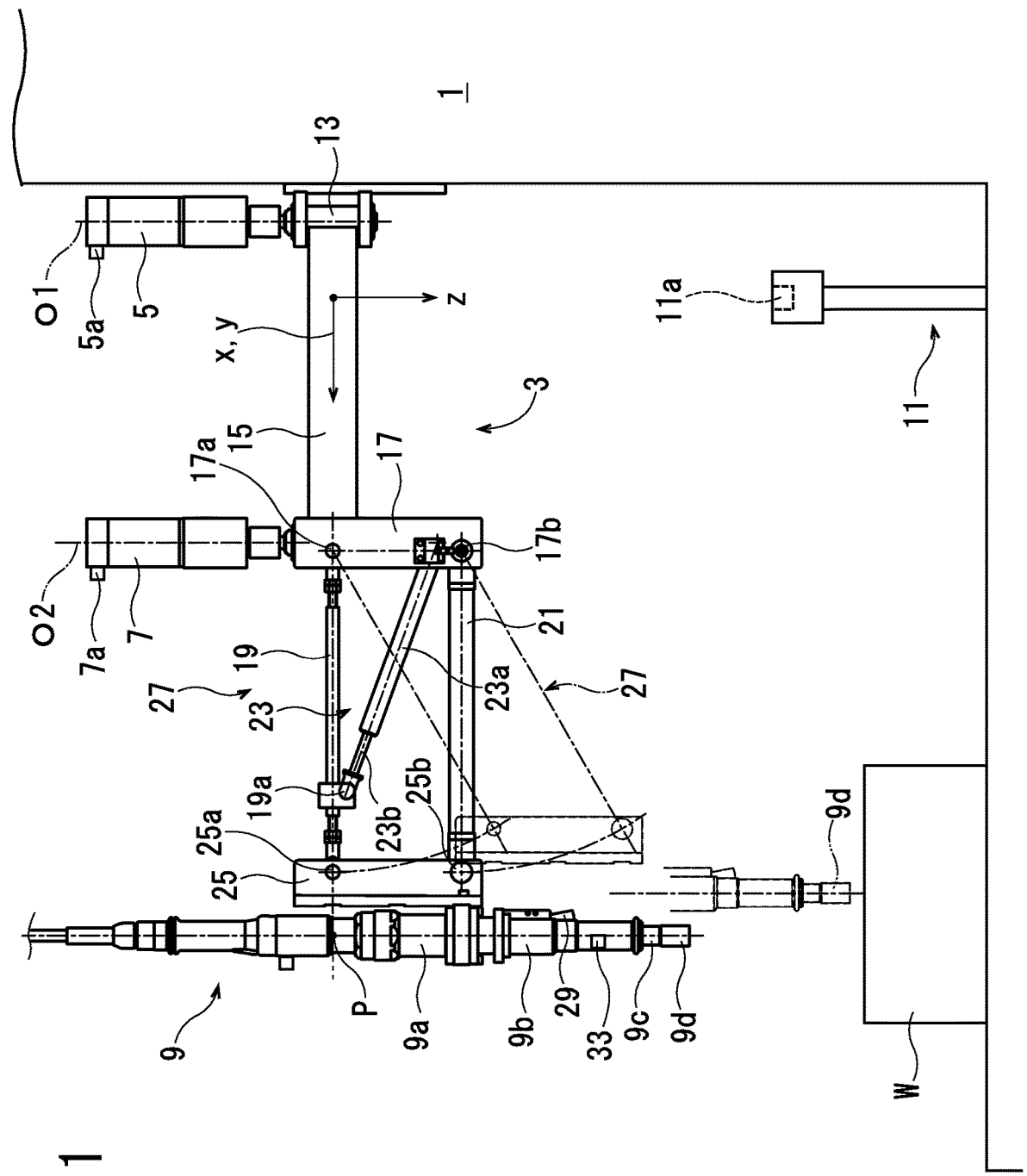
FIG. 1 is a side view of a fastening device of Embodiment 1, which is a representative manufacturing device according to the present teachings.
Figure 2:
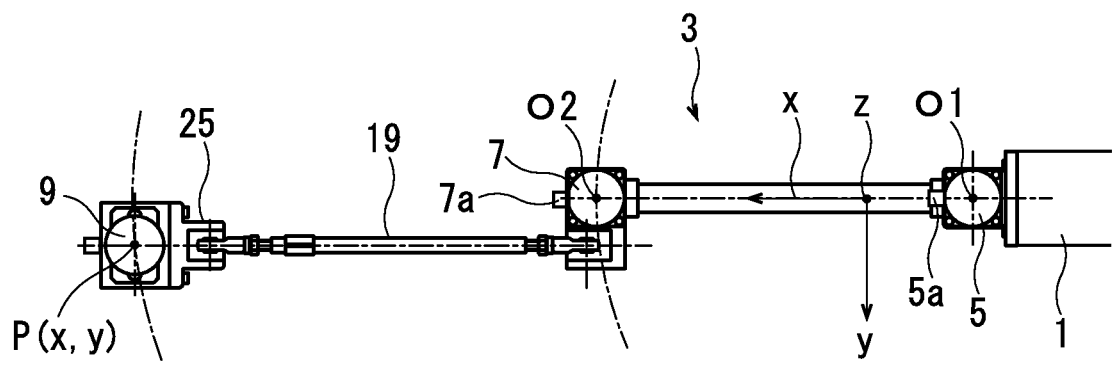
FIG. 2 is a plan view of the fastening device of Embodiment 1.

The manufacturing device of Embodiment 1 is a fastening device. As shown in FIGS. 1 and 2, this fastening device includes a base 1, a link mechanism 3, first and second servomotors 5, 7, and a known nut runner 9.

A workpiece W can be positioned and fixed on the base 1. In addition, a starting point confirmation stand 11 is provided on the base 1. A recess 11a, into which a socket 9d of the nut runner 9 is insertable from above, is formed in the upper end of the starting point confirmation stand 11.

The link mechanism 3 is provided on the base 1. In the link mechanism 3, a first hinge 13 is fixed to a side surface of the base 1. The first hinge 13 has a horizontal arm 15 that is swingable about vertically-extending, swing center axis O1. The horizontal arm 15 extends horizontally. A second hinge 17 is fixed to the tip end of the horizontal arm 15. The second hinge 17 has first and second links 19, 21 and a damper 23 that are swingable about vertically-extending, swing center axis O2.

The first link 19 extends parallel to the second link 21 above the second link 21. The first link 19 is provided on the second hinge 17 in a vertically-swingable manner via pin 17a. The second link 21 is provided on the second hinge 17 in a vertically-swingable manner via pin 17b. The damper 23 has a main body 23a provided on the second hinge 17 in a vertically-swingable manner, and a rod 23b provided on a tip end part of the first link 19 in a vertically-swingable manner via pin 19a. A vertically-extending attachment bracket 25 is provided at the tip ends of the first and second links 19, 21. The first link 19 and the attachment bracket 25 are vertically swingable via pin 25a, and the second link 21 and the attachment bracket 25 are vertically swingable via pin 25b. The second hinge 17, the first and second links 19, 21, the damper 23, and the attachment bracket 25 constitute a parallel link mechanism 27.

The vertically-extending nut runner 9 is fixed to the attachment bracket 25 via a not-illustrated lost motion mechanism. The nut runner 9 is a known one, and this is a manufacturing means. A non-illustrated stopper is provided between the second hinge 17 and the first and second links 19, 21. The state, in which the first and second links 19, 21 become horizontal owing to the stopper, is referred to as the elevated point. In addition, when the operator releases his/her hand from the nut runner 9, the first and second links 19, 21 are caused to be positioned at the elevated point by the damper 23. In this way, the link mechanism 3 enables three-dimensional movement of the nut runner 9 while holding the nut runner 9.

The first servomotor 5, which is capable of horizontally rotating the horizontal arm 15, is provided at an upper part of the first hinge 13 of the link mechanism 3. A first position sensor 5a is provided on the first servomotor 5. In addition, the second servomotor 7, which is capable of horizontally rotating the parallel link mechanism 27, is provided at an upper part of the second hinge 17. A second position sensor 7a is provided on the second servomotor 7. The first and second position sensors 5a, 7a are capable of detecting the current coordinates of the nut runner 9 in an xy plane. The first and second servomotors 5, 7 correspond to drive means. The first and second position sensors 5a, 7a correspond to a current coordinate detection means.

Raising and lowering of the nut runner 9 are to be performed manually via the parallel link mechanism 27. That is, the nut runner 9 is positioned in the horizontal xy plane by the first and second servomotors 5, 7, and is configured to be manually raised and lowered in a z axis direction that is perpendicular to the xy plane.

The nut runner 9 includes a main body 9a, which encloses a servomotor and a speed reducer, and a handle portion 9b that is located below the main body 9a and that the operator holds. A rotating shaft 9c, which is capable of being rotatably driven, protrudes from the lower end of the handle portion 9b, and the socket 9d is fixed to the lower end of the rotating shaft 9c. The socket 9d is capable of engaging a head of a bolt or a nut of a fastener C (see FIG. 4).

In addition, a handle switch ("SW") 29 is provided on the handle portion 9b of the nut runner 9. The handle SW 29 is located at a position that the operator grasps and moves the nut runner 9 while the socket 9d is being rotated. The main body 9a and the handle portion 9b of the nut runner 9 are manually lowered by the operator, and the socket 9d is capable of screwing the fastener C into the workpiece W. The socket 9d is representative example of an acting part according to the present teachings.

If the operator continues to grasp the handle SW 29 while the operator is moving the nut runner 9, the manual input of the operator is continuously performed and a continuation signal is generated. In addition, if the operator releases the handle SW 29 in the event of an emergency, the manual input is not continuously performed and a stop signal is generated. The handle SW 29 is a continuation-stop detection means.

Figure 3:
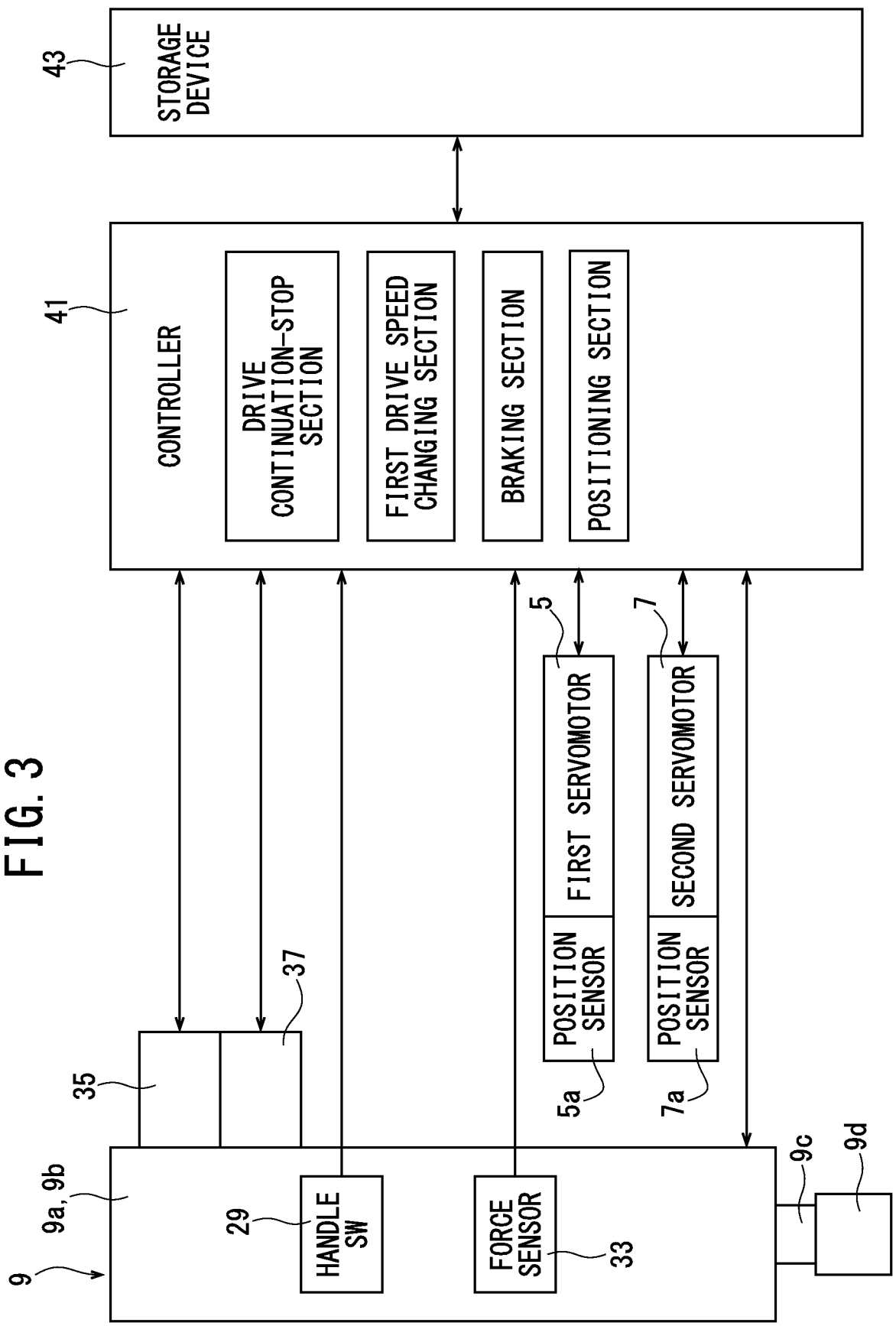
FIG. 3 is a block diagram of the fastening device of Embodiment 1.

Furthermore, a force sensor 33 is provided on the handle portion 9b of the nut runner 9. The force sensor 33 is capable of detecting the manual force of the operator. The force sensor 33 corresponds to a manual force detection means. In addition, as shown in FIG. 3, an operation lamp 35 and a tightening-completion lamp 37 are provided on the nut runner 9.

Figure 5:
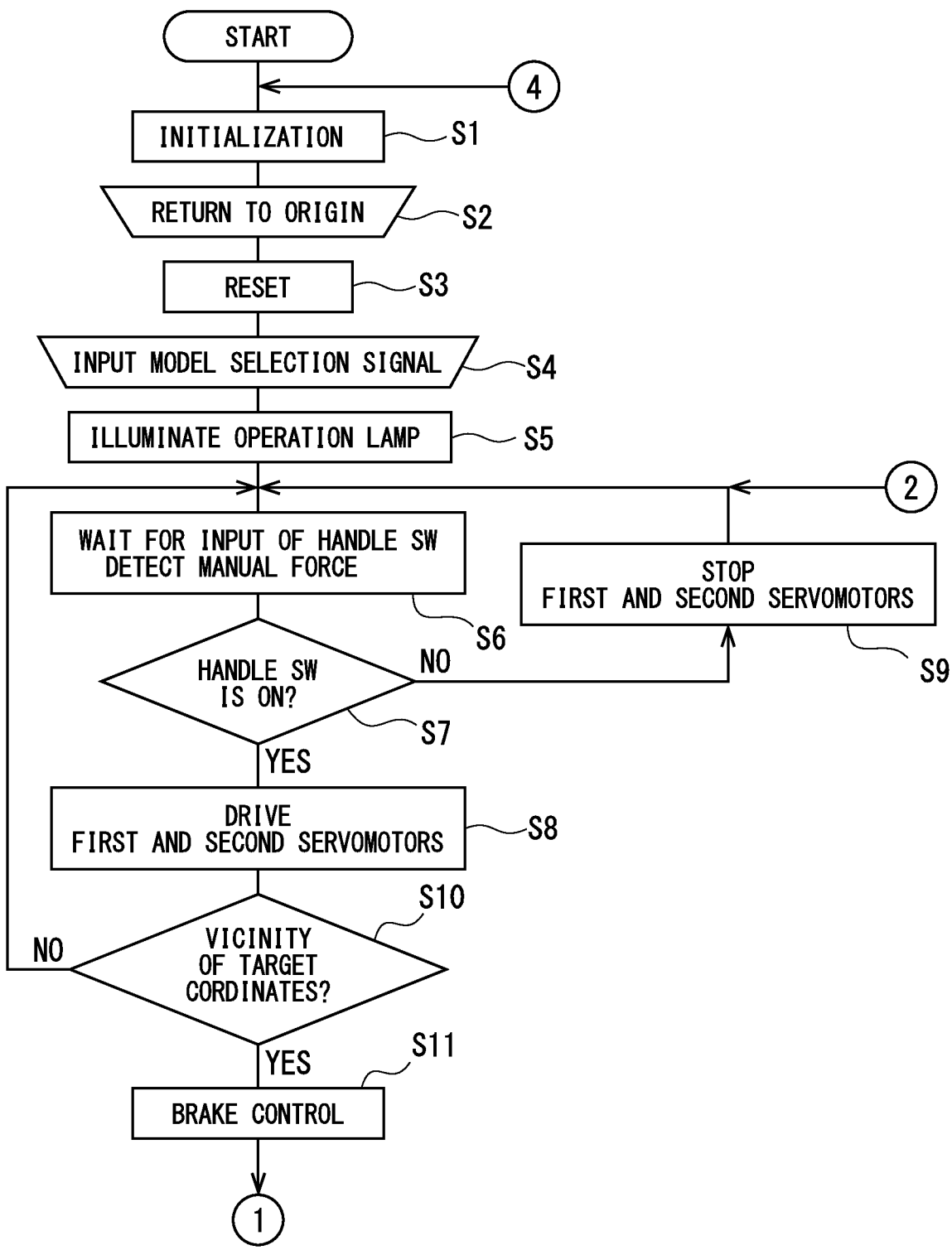
FIG. 5 is a part of a flowchart executed by the fastening device of Embodiment 1.
Figure 6:
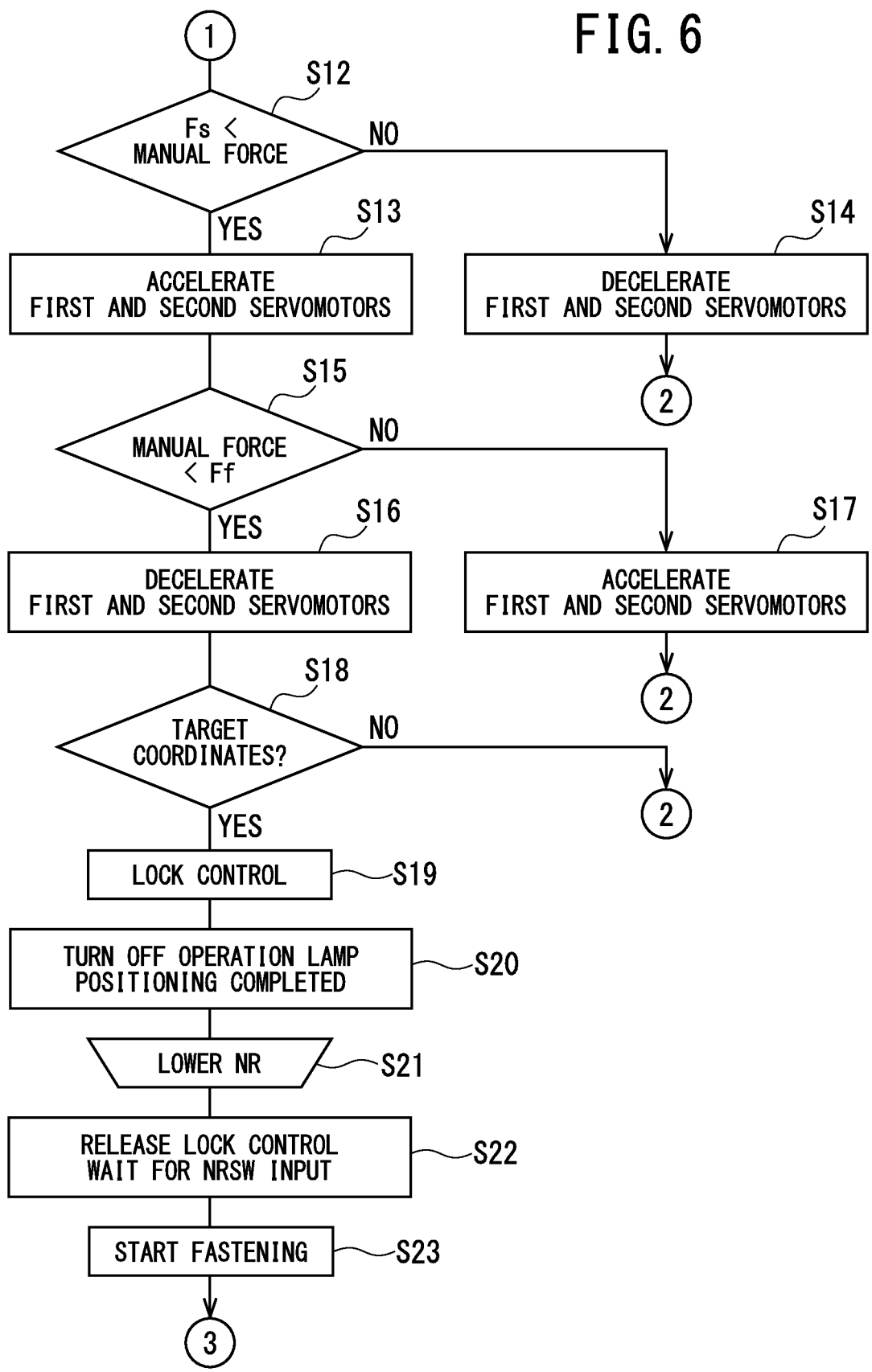
FIG. 6 is another part of the flowchart executed by the fastening device of Embodiment 1.
Figure 7:
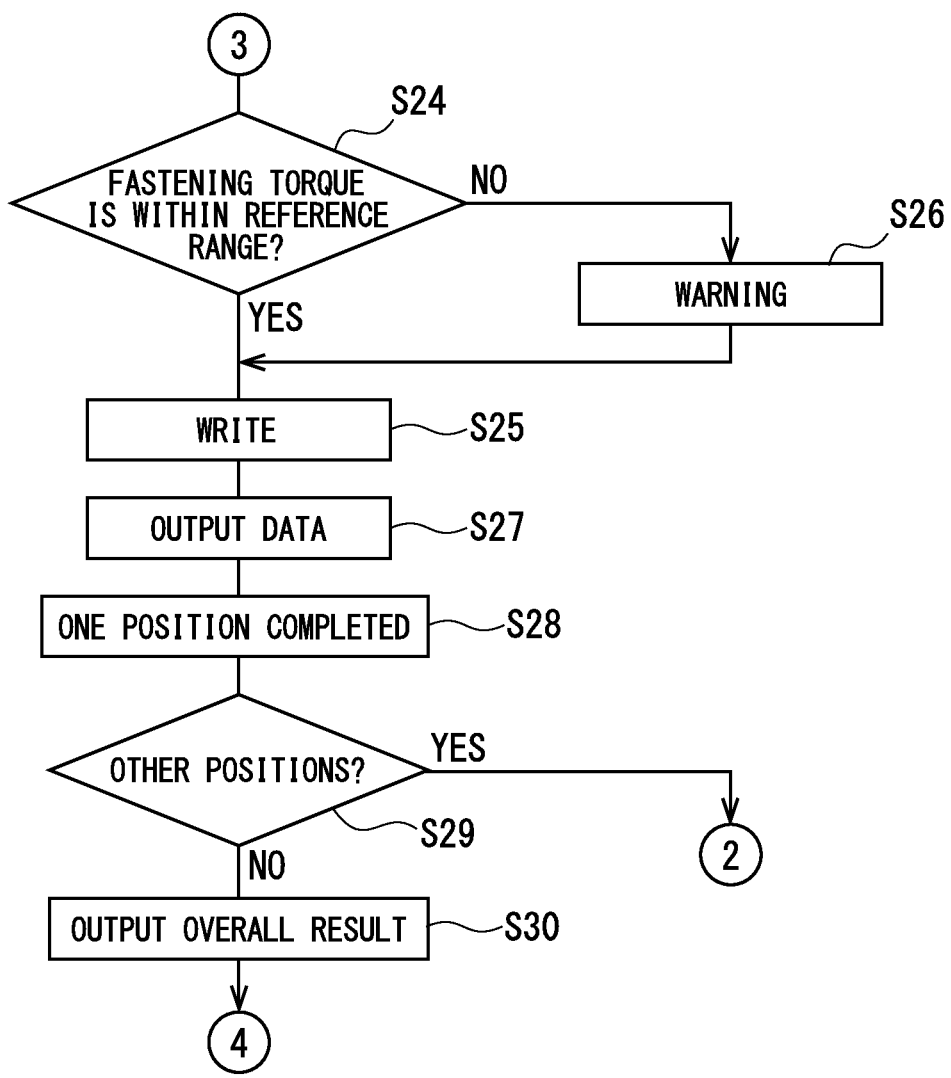
FIG. 7 is another part of the flowchart executed by the fastening device of Embodiment 1.

The fastening device also includes a controller 41 and a storage device 43. The servomotor of the nut runner 9, the first and second servomotors 5, 7, the first and second position sensors 5a, 7a, the handle SW 29, the force sensor 33, the operation lamp 35, and the tightening-completion lamp 37 are connected to the controller 41. In addition, a program capable of executing the flowcharts shown in FIGS. 5-7 is stored in the controller 41.

Figure 4:
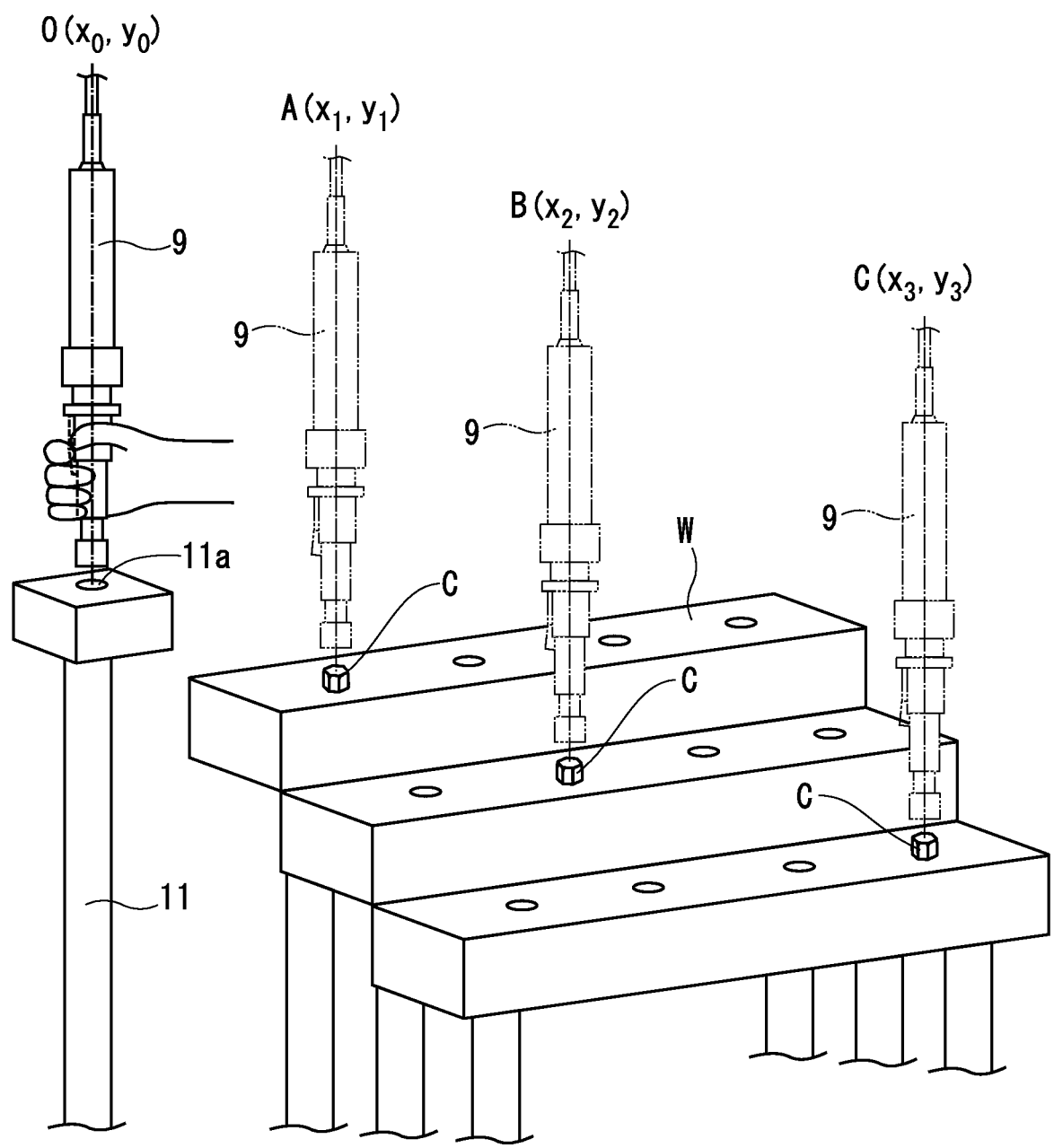
FIG. 4 relates to the fastening device of Embodiment 1, and is a schematic perspective view that shows a state in which the device is being taught target coordinates.

The storage device 43 is capable of storing a plurality of target coordinates that position the nut runner 9 so that the socket 9d of the nut runner 9 acts on the workpiece W. As shown in FIG. 4, the operator moves the nut runner 9 while grasping the handle SW 29; after inserting the socket 9d into the recess 11a, each of the target coordinates are taught to the storage device 43 by sequentially positioning the socket 9d on the fasteners C on the workpiece W. For example, when the socket 9d is in the recess 11a, the current coordinates P (x, y) of the nut runner 9 at this position are the origin O (x0, y0). In addition, at the position where a fastener C is first screwed into the workpiece W, the current coordinates P (x, y) will be Position A (x1, y1). In addition, at the position where a fastener C is next screwed into the workpiece W, the current coordinates P (x, y) will be Position B (x2, y2). Furthermore, at the position where a fastener C is next screwed into the workpiece W, the current coordinates P (x, y) will be Position C (x3, y3).

Here, as shown in FIG. 1, while the nut runner 9 is being lowered, the parallel link mechanism 27 also horizontally displaces the nut runner 9. Hence, each of the target coordinates is not the actual three-dimensional coordinates where the socket 9d screws a fastener C on the workpiece W, but are the coordinates in the xy plane, in which the value in the z axis direction of the actual coordinates is set to 0 and the amount of displacement in the horizontal plane by the parallel link mechanism 27 has been corrected in the x axis direction and the y axis direction. It is noted that, after storing each of the target coordinates in the storage device 43, it is possible to change the sequential order of each of the target coordinates.

It is also possible to write a target fastening torque and a resulting fastening torque at each of the target coordinates into the storage device 43 shown in FIG. 3.

By turning on an operation switch, this fastening device operates according to flowcharts of FIGS. 5 to 7. First, initialization is performed in step S1 as shown in FIG. 5. At this time, a check of the servomotor of the nut runner 9, the first and second servomotors 5, 7, the first and second position sensors 5a, 7a, the handle SW 29, the force sensor 33, the operation lamp 35, the tightening-completion lamp 37, etc. is performed. In addition, each of the target coordinates is stored in the storage device 43 by a computer (PC).

Then, in step S2, the nut runner 9 is moved while the operator grasps the handle SW 29 and the handle portion 9b, the socket 9d is inserted into the recess 11a and a return to origin O is performed. In this state, a reset signal is transmitted to the controller 41, and in step S3, the controller 41 is reset. In addition, in step S4, the operator inputs a model selection signal that specifies the fastening operation. As a result, the operation lamp 35 is illuminated in step S5.

In step S6, the controller 41 waits for a signal from the handle SW 29, and also waits for a signal from the force sensor 33. In the next step S7, the presence or absence of a continuation signal from the handle SW 29 is ascertained. Here, if it is YES, the operator is continuously grasping the handle SW 29 during the movement of the nut runner 9 from the current coordinates P (x, y), e.g., to Position A (x1, y1), and the handle SW 29 is transmitting the continuation signal to the controller 41. Therefore, the controller 41 continuously drives the first and second servomotors 5, 7 in step S8. For this reason, if the operator continuously grasps the handle SW 29, because the nut runner 9 is brought close to Position A (x1, y1), the operator need not memorize Position A (x1, y1), and the burden on the operator is small.

On the other hand, if it is NO in step S7, the operator has suddenly released his/her hand from the handle SW 29 during the movement of the nut runner 9 from the current coordinates P (x, y) to Position A (x1, y1), and the handle SW 29 transmits a stop signal to the controller 41. Hence, the controller 41 stops the first and second servomotors 5, 7 in step S9. It then returns to step S6. Thus, with regard to this fastening device, the operator participates during the movement of the nut runner 9 from the current coordinates P (x, y) to Position A (x1, y1). In addition, even though the operator participates in the fastening work, the safety of the operator is ensured, because the first and second servomotors 5, 7 are stopped without going out of control when the manual force, which indicates that the handle SW 29 is being grasped, is no longer continuously being applied. Hence, this fastening device does not require a partition wall or the like for isolating the operator from the fastening work. Steps S6 to S9 correspond to a drive continuation-stop section.

Figure 8:
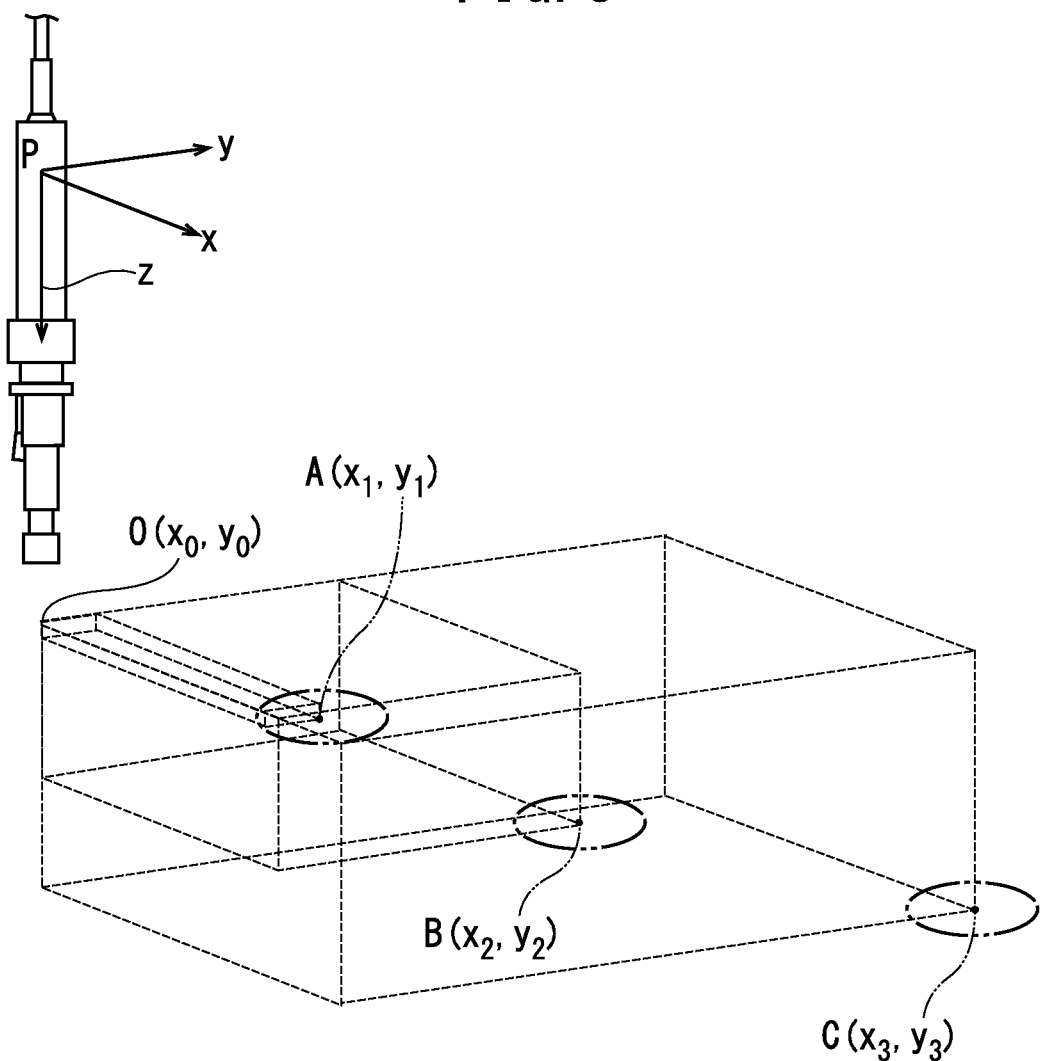
FIG. 8 relates to the fastening device of Embodiment 1, and is a schematic perspective view that shows the target coordinates of each position.
Figure 9:
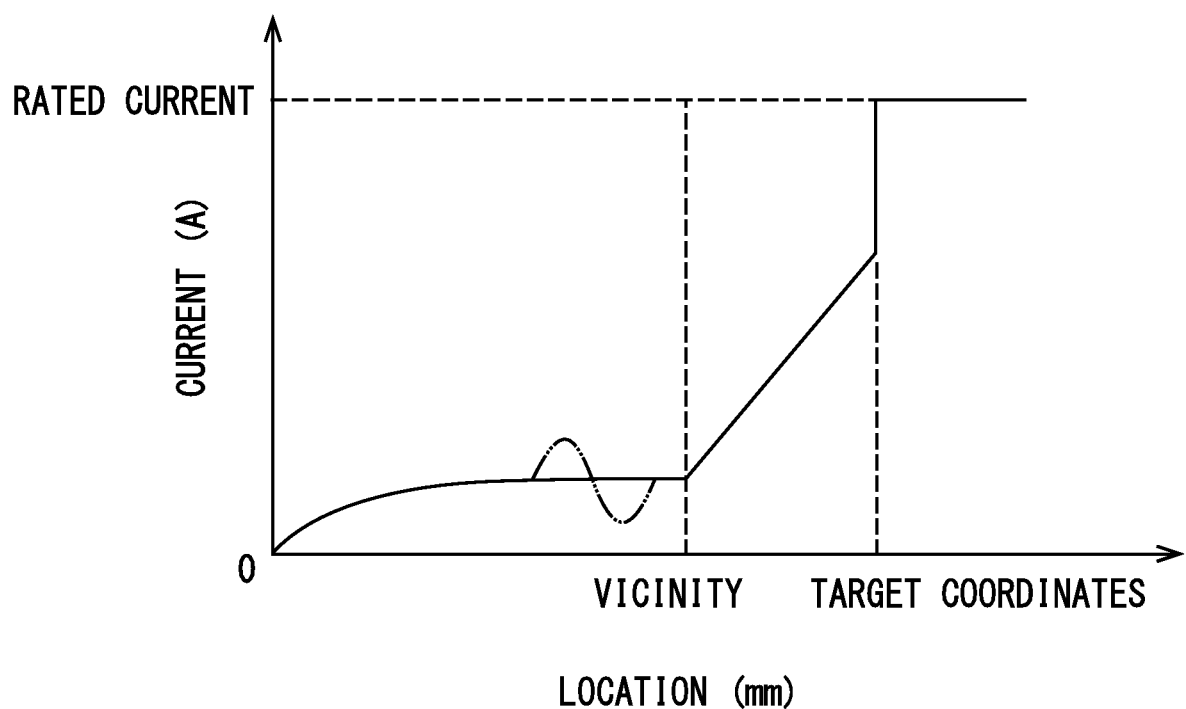
FIG. 9 relates to the fastening device of Embodiment 1, and is a graph that shows the relationship between the target coordinates and the current that is being supplied to first and second servomotors.

After executing step S8, it is ascertained in step S10 whether or not the current coordinates P (x, y) are in the vicinity of Position A (x1, y1). At this time, as shown in FIG. 8 for example, if a circle having a constant radius around Position A (x1, y1) is virtualized and the current coordinates P (x, y) are located within this circle, it is ascertained that the current coordinates P (x, y) are in the vicinity of Position A (x1, y1); if the current coordinates P (x, y) are located outside of this circle, it is ascertained that the current coordinates P (x, y) are not in the vicinity of Position A (x1, y1). Here, if it is YES, it proceeds to step S11, and braking control is performed on the first and second servomotors 5, 7. For example, as shown in FIG. 9, the braking control increases the current value (A) that is supplied to the first and second servomotors 5, 7 so that braking is generated in the first and second servomotors 5, 7 as the target coordinates come closer. Steps S10 and S11 correspond to a braking section. Here, if it is NO, it returns to step S6. In this way, movement of the nut runner 9 from the current coordinates P (x, y) to Position A (x1, y1) can be performed smoothly.

As shown in FIG. 6, it is ascertained in step S12 whether or not the manual force of the operator that is input from the force sensor 33 exceeds a predetermined first reference force Fs. Here, if the manual force exceeds the first reference force Fs (YES), it proceeds to step S13 and the first and second servomotors 5, 7 are accelerated. On the other hand, if the manual force falls below the first reference force Fs (NO), it proceeds to step S14 and the first and second servomotors 5, 7 are decelerated. For example, acceleration control of the first and second servomotors 5, 7 increases the current value (A) supplied to the first and second servomotors 5, 7, as shown in FIG. 9. On the other hand, deceleration control of the first and second servomotors 5, 7 decreases the current value (A) supplied to the first and second servomotors 5, 7. After executing step S14 shown in FIG. 6, it returns to step S6.

In addition, after executing step 13, it is ascertained in step S15 whether or not the manual force of the operator is less than a predetermined second reference force Ff. Here, if the manual force falls below the second reference force Ff (YES), it proceeds to step S16 and the first and second servomotors 5, 7 are decelerated. On the other hand, if the manual force exceeds the second reference force Ff (NO), it proceeds to step S17 and the first and second servomotors 5, 7 are accelerated. After executing step S17, it returns to step S6. Steps S12 to S17 correspond to a first drive-speed changing section.

Thus, in this fastening device, if the operator manipulates the nut runner 9 with a strong manual force, the driving speeds of the first and second servomotors 5, 7 become faster; if the operator manipulates the nut runner 9 with a weak manual force, the driving speeds of the first and second servomotors 5, 7 become slower. Hence, with this fastening device, an operator who is not accustomed to a certain fastening work can take his/her time to do the fastening work carefully, and get accustomed to the fastening work. On the other hand, if the operator gets accustomed to the same fastening work, it is possible to finish that fastening work earlier.

After executing step S16, it is ascertained in step S18 whether or not the current coordinates P (x, y) coincide with Position A (x1, y1). Here, if it is YES, it proceeds to step S19 and the first and second servomotors 5, 7 are lock controlled. The lock control, for example, maximizes the current value (A) supplied to the first and second servomotors 5, 7, as shown in FIG. 9. If it is NO here, it returns to step S6.

After executing step S19, the operation lamp 35 is turned off in step S20. With this, the operator can confirm that the nut runner 9 has been positioned and can be notified that it is time to lower the nut runner 9. Steps S18 and S19 correspond to a positioning section.

In step S21, the operator manually lowers the nut runner 9. At this time, because the nut runner 9 is displaced in the x axis direction and the y axis direction by the parallel link mechanism 27, the lock control is released in step S22. Furthermore, it waits until the socket 9d is pressed upward from the workpiece W with a certain pressure or stronger. In step S23, if the handle SW 29 is continuously grasped at this time, the rotating shaft 9c rotates to fasten the fastener C with the target fastening torque. Thus, the socket 9d can screw the fastener C into the workpiece W at Position A (x1, y1).

As shown in FIG. 7, it is ascertained in step S24 whether or not the resulting fastening torque is within a reference range. Here, if the resulting fastening torque is within the reference range (YES), it proceeds to step S25 and this is written into the storage device 43. If the resulting fastening torque is not within the reference range (NO), it proceeds to step S26; after warning in advance, it proceeds to step S25 and this is written into the storage device 43. Then, in step S27, the resulting fastening torque at the time that the fastener C has been actually fastened is output from the nut runner 9.

In the next step S28, completion processing of one position is performed. For example, fastening at Position A (x1, y1) is completed. Thereafter, it is ascertained in step S29 whether or not there are any remaining positions. Here, if it is YES, it returns to step S6. In this way, the same fastening is performed at Position B (x2, y2), at Position C (x3, y3), etc. If it is NO in step S29, an overall result is output in step S30, and it returns to step S1 to perform fastening work of a specified model number.

Thus, in this fastening device, if a plurality of target coordinates is stored together in the storage device 43 with the sequential order thereof, the nut runner 9 moves to each of the target coordinates while assisting the operator. Raising and lowering of the nut runner 9 and rotation of the socket 9d are based on the manual input of the operator.

Accordingly, this fastening device can be reduced in size and a reduction of manufacturing cost is realizable.

Embodiment 2

Figure 10:
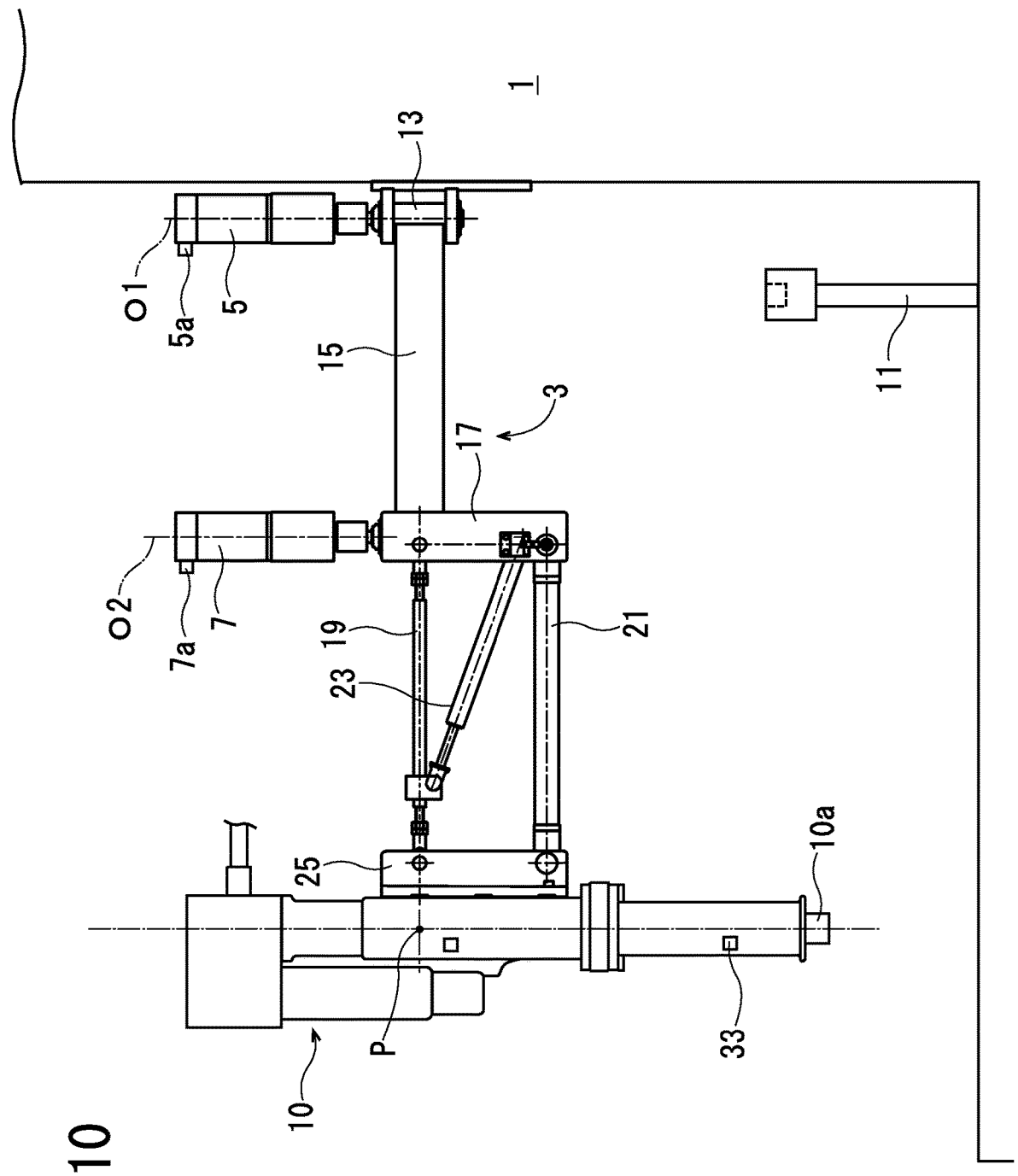
FIG. 10 is a side view of a pressure-applying device of Embodiment 2, which is another representative manufacturing device according to the present teachings.

As shown in FIG. 10, the manufacturing device of Embodiment 2 is a pressure-applying device that uses a known servo press 10 as the manufacturing means.

The servo press 10 encloses a servomotor, a speed reducer, and a rotating shaft that are not shown, and the rotating shaft is rotated by the servomotor. An acting part 10a is capable of pressing against workpiece by advancing straight ahead in the axial direction and by rotating the rotating shaft. The base 1, the link mechanism 3, the first and second servomotors 5, 7, the first and second position sensors 5a, 7a, the handle SW 29, the force sensor 33, the controller 41, and the storage device 43 are the same as the fastening device of Embodiment 1.

In this pressure-applying device, manufacturing work such as crimping and press-fitting of the workpiece can be performed by the servo press 10. Furthermore, in this pressure-applying device as well, a reduction of size can be realized and a reduction of manufacturing cost is realizable.

Embodiment 3

Figure 11:
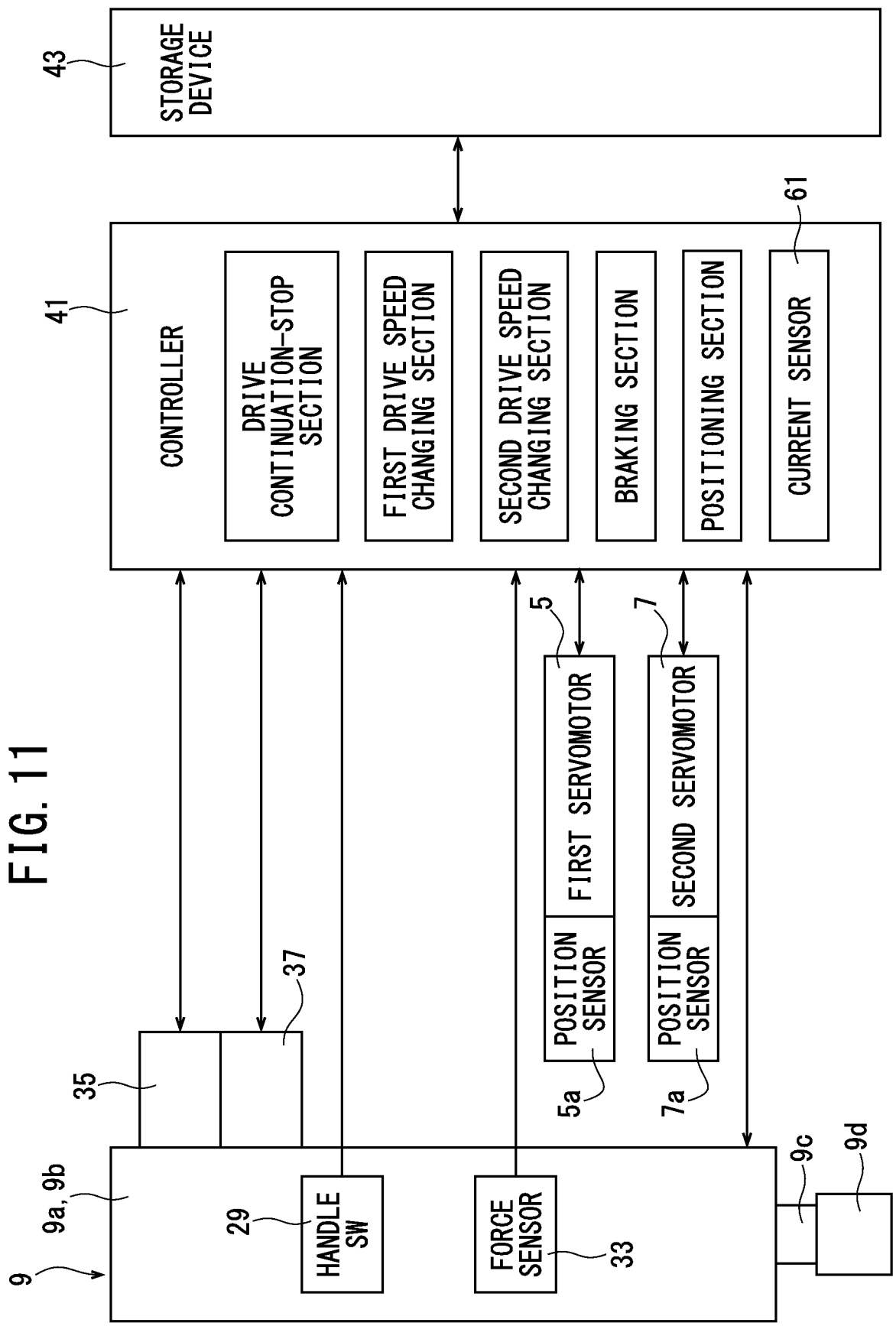
FIG. 11 is a block diagram of a fastening device of Embodiment 3, which is another representative manufacturing device according to the present teachings.
Figure 12:
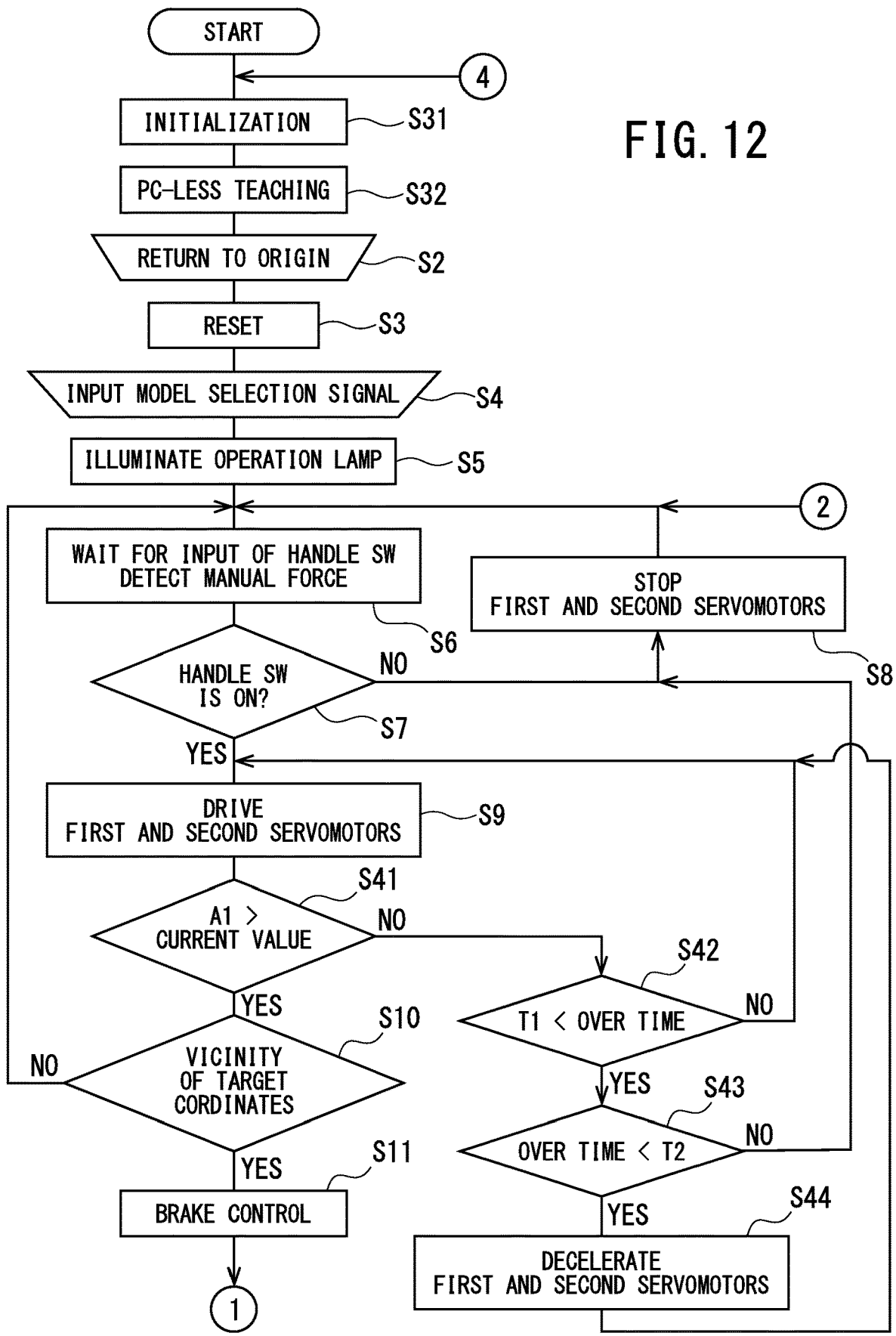
FIG. 12 is a part of a flowchart executed by the fastening device of Embodiment 3.

In the fastening device of Embodiment 3 as shown in FIG. 11, a current sensor 61 is additionally provided within the controller 41 in the fastening device of Embodiment 1. The current sensor 61 corresponds to operation state detection means. The current sensor 61 is capable of detecting the current value of the current being supplied to the first and second servomotors 5, 7. In addition, a program capable of executing the flowcharts shown in FIGS. 12, 6, and 7 is stored in the controller 41. Other constituents of Embodiment 3 are the same as Embodiment 1. Hence, constituents that are the same as Embodiment 1 are assigned the same reference symbols, and descriptions thereof are simplified or omitted.

By turning on an operation switch, this fastening device operates according to the flowchart of FIG. 12. First, initialization is performed in step S31 in the same manner as in step S1 shown in FIG. 5 of Embodiment 1.

Then, in step S32, each of the target coordinates is stored in the storage device 43 without using a PC. Specifically, while the operator sequentially moves the nut runner 9 to each of the target coordinates, the target coordinates transmitted from first and second position sensors 5a, 7a are stored in the storage device 43. Thus, in this fastening device, it is possible to store each of the target coordinates in the storage device 43 more conveniently without using a PC.

After step S32, it is the same as Embodiment 1 up to step S9. After step S9, it is ascertained in step S41 whether or not the current value detected by the current sensor 61 exceeds a predetermined current reference value A1. Here, if the current value is less than the current reference value A1 (YES), it proceeds to step S10. Steps S10 and S11 are the same as Embodiment 1.

In step S41, if it is equal to or greater than the current reference value A1 (NO), it proceeds to step S42. In step S42, it is ascertained whether or not an over time, in which the current value continuously exceeds the current reference value A1, is longer than a predetermined first reference time T1. If the over time is equal to or less than the first reference time T1 (NO), the increase in current value is momentary; because it can be ascertained that it is a state in which, for example, there is no obstacle in the path of movement of the nut runner 9, it returns to step 9.

In step S42, if the over time is longer than the first reference time T1 (YES), because it can be considered that, for example, there is an obstacle in the path of movement of the nut runner 9, it proceeds to step 43. In step S43, it is ascertained whether or not the over time exceeds a predetermined second reference time T2. If the over time is greater than or equal to the second reference time T2 (NO), it proceeds to step S8 because it can be considered that the obstacle is still in the path of movement of the nut runner 9, and the first and second servomotors 5, 7 are stopped.

On the other hand, if the over time is less than the second reference time T2 (YES) in step S43, it proceeds to step S44 and the first and second servomotors 5, 7 are decelerated. Then, it returns to step S9. Steps S8 and S41 to S44 correspond to a second drive speed changing section. Other steps are the same as Embodiment 1.

Thus, in this fastening device, when the nut runner 9 interferes with some kind of obstacle and the torques of the first and second servomotors 5, 7 are increasing, the drive speed can be reduced or stopped.

Although the present teachings have been described above in accordance with Embodiments 1 to 3, the present invention is not limited to the above Embodiments 1 to 3, and can be appropriately changed without departing from the gist of the invention, as a matter of course.

For example, as the manufacturing means of the present teachings, it is not limited to the nut runner 9 of Embodiments 1 and 3 or the servo press 10 of Embodiment 2; various devices may be utilized as long as the device has an acting part that can act on the workpiece W.

Moreover, as the link mechanism of the present teachings, instead of utilizing the parallel link mechanism 27 of Embodiments 1 to 3, a device that has a vertically-extending guide rail and a slider that slides on the guide rail can also be utilized.

Further, although a drive source was utilized as the drive means in Embodiments 1 to 3 only for horizontally swinging the horizontal arm 15, the first and second links 19, 21, etc., the drive source can also be used to raise and lower the manufacturing means. Such drive sources are not limited to a servomotor; a stepping motor, a servo cylinder, etc. can also be utilized.

In addition, although the target coordinates in Embodiments 1 to 3 are coordinates (x, y) in an xy plane, the target coordinates may be three-dimensional coordinates (x, y, z).

Furthermore, although the first and second position sensors 5a, 7a are provided on the servo press 10 to detect the current coordinates P (x, y) of the nut runner 9 and the servo press 10 in Embodiments 1 to 3, these current coordinates may be detected by providing a position sensor on the nut runner 9 or the servo press 10. In addition, a camera capable of photographing the manufacturing means in the workplace may be provided, and the current coordinates of the manufacturing means may be detected by the camera.

INDUSTRIAL APPLICABILITY

The present invention is applicable to a fastening device, a pressure-applying device, etc.

EXPLANATION OF THE REFERENCE SYMBOLS

W workpiece
9d, 10a . . . acting part (9d . . . socket)
9, 10 . . . manufacturing means (9 . . . nut runner, 10 . . . servo press)
3 . . . link mechanism
5, 7 . . . drive means (first and second servomotors)
P (x, y) . . . current coordinates
5a, 7a . . . current coordinate detection means (first and second position sensors)
A (x1, y1), B (x2, y2), C (x3, y3) . . . target coordinates
43 . . . storage means (storage device)
41 . . . control means (controller)
29 . . . continuation-stop detection means (handle SW)
S6 to S9 . . . drive continuation-stop section
33 . . . manual force detection means (force sensor)
S12 to S17 . . . first drive-speed changing section
61 . . . operation state detection means (current sensor)
S8, S41 to S44 . . . second drive speed changing section
S10, S11 . . . braking section
S18, S19 . . . positioning section
9c . . . rotating shaft
9 . . . nut runner
10 . . . servo press

The invention claimed is:

1. A manufacturing device comprising:
a nut runner having an acting part and a rotatable shaft connected to the acting part, the acting part being configured to engage a fastener and to fasten the fastener to a workpiece when rotated by the rotating shaft;
a link mechanism that holds the nut runner and is configured to move the nut runner;
drive means for driving the link mechanism to move the nut runner;
current coordinate detection means for detecting current coordinates of the nut runner;
storage means for storing target coordinates for positioning the nut runner in order for the acting part to fasten a plurality of fasteners to the workpiece;
control means that controls the drive means to move the nut runner from the detected current coordinates to the stored target coordinates; and
continuation-stop detection means, provided on the nut runner, for generating a continuation signal when a manual input of an operator is being continuously performed and for generating a stop signal when the manual input is not being continuously performed;
wherein the link mechanism includes:
a first hinge fixed to a base and having an arm, the arm being swingable about a first shaft center axis that is parallel to the axial direction of the rotating shaft of the nut runner,
a second hinge fixed to the arm and having a link, the link being swingable about a second shaft center axis that is parallel to the first shaft center axis, and
an attachment provided on the link and holding the nut runner;
the drive means includes:
a first motor provided on the first hinge and is being configured to rotate the arm about the first shaft center axis, and
a second motor provided on the second hinge and is being configured to rotate the link about the second shaft center axis; and
wherein the control means has:
a drive continuation-stop section that drives the drive means in accordance with the continuation signal and stops the drive means in accordance with the stop signal; and
a braking section that controls the drive means such that, when the nut runner has been moved into a vicinity of the stored target coordinates, the drive means continues to move the nut runner toward the stored target coordinates under braking control that generates braking in the first and second motors as the nut runner comes closer to the stored target coordinates.

2. The manufacturing device according to claim 1, further comprising:
manual force detection means that is provided on the nut runner and detects a manual force of the operator,
wherein the control means further has a first drive speed changing section that changes a drive speed of the drive means in accordance with an output signal of the manual force detection means.

3. The manufacturing device according to claim 2, further comprising:
operation state detection means for detecting a physical quantity of actuation of the drive means,
wherein the control means has a second drive speed changing section that changes the drive speed of the drive means in accordance with an output signal of the operation state detection means.

4. The manufacturing device according to claim 3, wherein the control means further has a positioning section that generates a positioning signal when the nut runner converges to the stored target coordinates.

5. The manufacturing device according to claim 2, wherein the first drive speed changing section increases the drive speed of the drive means in response to receiving an output signal indicating an increase in the force applied to the manual force detection means and decreases the drive speed of the drive means in response to receiving an output signal indicating a decrease in the force applied to the manual force detection means.

6. The manufacturing device according to claim 1, further comprising:
operation state detection means for detecting a physical quantity of actuation of the drive means, wherein the control means has a second drive speed changing section that changes a drive speed of the drive means in accordance with an output signal of the operation state detection means.

7. The manufacturing device according to claim 1, wherein the control means further has a positioning section that generates a positioning signal when the nut runner converges to the stored target coordinates.

8. The manufacturing device according to claim 1, wherein the link mechanism further includes a damper having a main body connected to the second hinge and a rod pivotably connected to the link, the damper being configured to bias the link vertically upwards towards an elevated point of origin.

9. The manufacturing device according to claim 1, wherein the braking control is configured to increase a current value that is supplied to the first and second motors to generate braking in the first and second motors as the nut runner comes closer to the stored target coordinates.

10. The manufacturing device according to claim 9, wherein the braking control is configured to start to increase the current value that is supplied to the first and second motors to generate braking in the first and second motors in response to the current coordinate detection means detecting that the current coordinates fall within a predetermined circle surrounding the stored target coordinates.

11. A manufacturing device comprising:
a first hinge defining a first axis of rotation,
a horizontal arm connected to the first hinge such that the horizontal arm extends perpendicular to the first axis of rotation and is rotatable about the first axis of rotation,
a parallel link mechanism including a second hinge connected to the horizontal arm and defining a second axis of rotation, and first and second links pivotably connecting the second hinge to an attachment such that the attachment is vertically movable relative to the second hinge,
a fastening tool configured to engage a fastener,
a nut runner configured to rotatably drive the fastening tool about a third axis of rotation, the nut runner being connected to the attachment such that the first, second and third axes of rotation are in parallel and remain in parallel when the attachment is vertically moved relative to the second hinge,
a first motor provided on the first hinge and being configured to horizontally rotate the horizontal arm about the first axis of rotation,
a second motor provided on the second hinge and being configured to horizontally rotate the parallel link mechanism about the second axis of rotation,
at least one position sensor configured to detect current coordinates of the nut runner;
a storage device storing target coordinates defining a horizontal position of the fastening tool of the nut runner that is vertically above the fastener on a workpiece;
a handle switch disposed on the nut runner, the handle switch being configured to output an operation-continuation signal while an operator is manually holding the handle switch and to output an operation-stop signal when the handle switch is released,
a controller comprising a non-transitory computer-readable medium having computer-readable instructions stored therein, said computer-readable instructions comprising instructions executable by at least one processor to:

drive the first and second motors to move the nut runner from the current coordinates detected by the at least one position sensor to the target coordinates stored in the storage device while the controller is receiving the operation-continuation signal from the handle switch,
stop driving the first and second motors when the controller receives the operation-stop signal,
in response to the nut running moving from outside a vicinity of the stored target coordinates to within the vicinity of the stored target coordinates, generate braking in the first and second motors such that the nut runner converges toward the stored target coordinates while braking is being applied to the first and second motors.

12. The manufacturing device according to claim 11, further comprising:
a force sensor disposed on the nut runner proximal to the handle switch and being configured to generate a force signal that is representative of a pressure applied by the operator while grasping the nut runner,
wherein the computer-readable instructions further comprise instructions to increase a drive speed of the first and second motors in accordance with a force signal indicating an increase in the pressure applied to the force sensor and to decrease the drive speed of the first and second motors in accordance with a force signal indicating a decrease in the pressure applied to the force sensor.

13. The manufacturing device according to claim 12, further comprising:
a current sensor configured to generate a momentary current value signal representative of a current momentarily being supplied to the first motor and second motor,
wherein the computer-readable instructions further comprise instructions to vary the drive speed of the first and second motors in accordance with the momentary current value signal.

14. The manufacturing device according to claim 13, wherein the computer-readable instructions further comprise instructions to:
compare the current coordinates detected by the at least one position sensor to the target coordinates stored in the storage device, and
drive the first and second motors to lock the nut runner in a horizontal position corresponding to the stored target coordinates when the detected current coordinates coincide with the stored target coordinates.

15. The manufacturing device according to claim 14, wherein the fastening tool is a socket configured to engage a head of a bolt or a nut.

16. The manufacturing device according to claim 15, wherein the first and second drive motors are both servo-motors.

17. The manufacturing device according to claim 16, wherein the parallel link mechanism further includes a damper having a main body connected to the second hinge and a rod pivotably connected to the first link, the damper being configured to bias the first and second links vertically upwards towards an elevated point of origin.

18. The manufacturing device according to claim 11, wherein the computer-readable instructions further comprise instructions to increase a current value that is supplied to the first and second motors to generate the braking in the first and second motors in response to the nut runner moving into the vicinity of the stored target coordinates.

19. The manufacturing device according to claim 18, wherein:
- the computer-readable instructions further comprise instructions to start to increase the current value that is supplied to the first and second motors to generate braking in the first and second motors in response to the at least one position sensor detecting that the current coordinates fall within the vicinity of the stored target coordinates; and
- the vicinity of the stored target coordinates is defined by a predetermined circle surrounding the stored target coordinates.

20. The manufacturing device according to claim 19, further comprising:
- a force sensor disposed on the nut runner proximal to the handle switch and being configured to generate a force signal that is representative of a pressure applied by the operator while grasping the nut runner,
- wherein the computer-readable instructions further comprise instructions to increase a drive speed of the first and second motors in accordance with a force signal indicating an increase in the pressure applied to the force sensor and to decrease the drive speed of the first and second motors in accordance with a force signal indicating a decrease in the pressure applied to the force sensor.

* * * * *